United States Patent
Angara et al.

(10) Patent No.: US 10,771,504 B2
(45) Date of Patent: Sep. 8, 2020

(54) SYSTEMS AND METHODS FOR IDENTIFYING DATA BREACHES

(71) Applicant: Symantec Corporation, Mountain View, CA (US)

(72) Inventors: SriHarsha Angara, Culver City, CA (US); Michael Lo, Culver City, CA (US); Srini Chillappa, Culver City, CA (US); Simon Tiku, Culver City, CA (US); Viral Mehta, Culver City, CA (US); John Meehan, Culver City, CA (US)

(73) Assignee: NortonLifeLock Inc., Tempe, AZ (US)

( * ) Notice: Subject to any disclaimer, the term of this patent is extended or adjusted under 35 U.S.C. 154(b) by 220 days.

(21) Appl. No.: 16/004,357

(22) Filed: Jun. 9, 2018

(65) Prior Publication Data

US 2019/0379695 A1    Dec. 12, 2019

(51) Int. Cl.
*H04L 29/06* (2006.01)
*G06F 21/62* (2013.01)

(52) U.S. Cl.
CPC ...... *H04L 63/1491* (2013.01); *G06F 21/6263* (2013.01)

(58) Field of Classification Search
CPC .............. H04L 63/1491; G06F 21/6263
See application file for complete search history.

(56) References Cited

U.S. PATENT DOCUMENTS

| 2004/0139025 A1* | 7/2004 | Coleman ............. G06F 21/6254 705/51 |
| 2016/0323229 A1* | 11/2016 | Le Jouan .............. H04L 67/306 |
| 2017/0024581 A1* | 1/2017 | Grubel ................ H04L 63/0407 |
| 2018/0174213 A1* | 6/2018 | Barday .............. G06Q 30/0609 |

FOREIGN PATENT DOCUMENTS

| GB | 2 540 656 A | 1/2017 |
| WO | 2013/163652 A2 | 10/2013 |
| WO | 2016/164706 A1 | 10/2016 |

OTHER PUBLICATIONS

International Search Report and Written Opinion received for PCT Application Serial No. PCT/US2019/023863 dated May 23, 2019, 12 pages.
Privacy Score Product; https://privacyscore.org/; as accessed Sep. 10, 2018.

* cited by examiner

*Primary Examiner* — Hee K Song
(74) *Attorney, Agent, or Firm* — FisherBroyles, LLP

(57) ABSTRACT

The disclosed computer-implemented method for detecting unauthorized data shares may include (1) providing a user of an anonymized inbox with an email alias to use for a particular online entity, (2) identifying one or more emails sent to the email alias from one or more different entities that are different from the particular online entity, (3) determining, based on the one or more emails having been sent by the different entities, that the particular online entity has shared the user's email alias with other entities, and (4) creating a privacy score for the particular online entity based at least in part on the determination that the particular online entity has shared the user's email alias with other entities. Various other methods, systems, and computer-readable media are also disclosed.

20 Claims, 7 Drawing Sheets

Email Aliases
500

----

****

Digital Streaming Provider 400: makdi342@anoninbox.com

****

----

****

Online Banking Institution 402: geteid03@anoninbox.com

****

----

****

Online Retailer 404: kk045dg@anoninbox.com

****

----

****

E-commerce Marketplace 406: xiokwo245@anoninbox.com

SYSTEMS AND METHODS FOR IDENTIFYING DATA BREACHES

BACKGROUND

In today's world, an Internet user may have numerous accounts with online service providers (e.g., online vendors, digital streaming providers, news outlets, etc.). Unfortunately, once a user creates an account with an online service provider, there is no mechanism for controlling the extent to which the online service provider shares the user's account information with other entities. Furthermore, when an online service provider has shared the user's account information, there is no mechanism for users to identify which of the online services he or she subscribes to has shared the account data. The instant disclosure, therefore, identifies and addresses a need for improved systems and methods for detecting unauthorized data shares (e.g., for identifying online entities that share users' account data with other entities).

SUMMARY

As will be described in greater detail below, the instant disclosure describes various systems and methods for detecting unauthorized data shares. In one example, a computer-implemented method for detecting unauthorized data shares may include (1) providing a user of an anonymized inbox with an email alias to use for a particular online entity, (2) identifying one or more emails sent to the email alias from one or more different entities that are different from the particular online entity, (3) determining that one or more different entities, which are different from the particular online entity, have used the masked credit card information, and (4) creating a privacy score for the particular online entity based at least in part on the determination that the particular online entity has shared the user's email alias with other entities.

In one embodiment, identifying the emails from the different entities may include identifying a number of different entities that have sent emails to the email alias and creating the privacy score may include creating the privacy score based additionally on the identified number of different entities. In one embodiment, the computer-implemented method may further include (1) additionally providing the user with masked credit card information to use for the particular online entity, (2) determining that one or more different entities, which are different from the particular online entity, have used the masked credit card information, and (3) creating the privacy score based additionally on the determination that the one or more different entities have used the masked credit card information.

In one embodiment, the computer-implemented method may further include (1) identifying a number of trackers and/or a number of advertisements on a website of the particular online entity, and (2) creating the privacy score based additionally on the identified number of trackers and/or the identified number of advertisements on the website. Additionally or alternatively, the computer-implemented method may further include (1) identifying, on one or more additional websites, content in one or more advertisements and/or trackers that was present on a website of the particular online entity when the user visited the website and (2) creating the privacy score based additionally on having identified the content on the one or more additional websites.

In one embodiment, the computer-implemented method may further include (1) determining, from a data security monitoring service, that the email alias has been leaked and (2) creating the privacy score based additionally on determining, from the data security monitoring service, that the email alias has been leaked. In one embodiment, the computer-implemented method may further include (1) additionally providing the user with a masked telephone number to use for the particular online entity, (2) determining that the masked telephone number has been used by one or more different entities that are different from the particular online entity, (3) determining, based on the different entities having used the masked telephone number, that the particular online entity has shared the masked telephone number with other entities, and (4) creating the privacy score based additionally on the determination that the particular online entity has shared the masked telephone number with other entities.

In some examples, the computer-implemented method may further include using a tracker-crawler to identify a fingerprinting script being served from one or more domains owned by the particular online entity and creating the privacy score based additionally on the identified fingerprinting script. In one embodiment, the computer-implemented method may further include identifying news content describing a data breach by the particular online entity and creating the privacy score based additionally on the identified news content.

In one embodiment, the computer-implemented method may further include (1) determining whether the particular online entity has shared email aliases of one or more additional users of anonymized inboxes with other entities and (2) creating the privacy score for the particular online entity based additionally on whether the particular online entity has shared the email aliases of the one or more additional users with other entities.

In one example, the computer-implemented method may further include (1) determining that the privacy score falls below a privacy score threshold and (2) protecting the user and/or an additional user against unauthorized data sharing by the particular online entity in response to the determination that the privacy score falls below the privacy score threshold. In some examples, protecting the user and/or the additional user may include transmitting a warning prompt to at least one of the user and the additional user and/or blocking at least one of the user and the additional user from electronically sharing personal data with the particular online entity.

The particular online entity may represent a variety of online entities, including, without limitation (1) an online vendor, (2) an online service, and/or (3) a website. In some examples, identifying the emails sent to the email alias from the different entities may include (1) monitoring the anonymized inbox to identify emails that are sent to the email alias and (2) identifying the emails sent to the email alias from the different entities while monitoring the anonymized inbox.

In one embodiment, a system for implementing the above-described method may include (1) a providing module, stored in memory, that provides a user of an anonymized inbox with an email alias to use for a particular online entity, (2) an identification module, stored in memory, that identifies one or more emails sent to the email alias from one or more different entities that are different from the particular online entity, (3) a determination module, stored in memory, that determines, based on the one or more emails having been sent by the different entities, that the particular online entity has shared the user's email alias with other entities, (4) a scoring module, stored in memory, that creates a privacy score for the particular online entity based at least in part on the determination that the particular online entity has shared the user's email alias with other entities, and (5) at least one physical processor configured to execute the providing module, the identification module, the determination module, and the scoring module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) provide a user of an anonymized inbox with an email alias to use for a particular online entity, (2) identify one or more emails sent to the email alias from one or more different entities that are different from the particular online entity, (3) determine, based on the one or more emails having been sent by the different entities, that the particular online entity has shared the user's email alias with other entities, and (4) create a privacy score for the particular online entity based at least in part on the determination that the particular online entity has shared the user's email alias with other entities.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 5 is a block diagram of exemplary email aliases.

Figure 1:
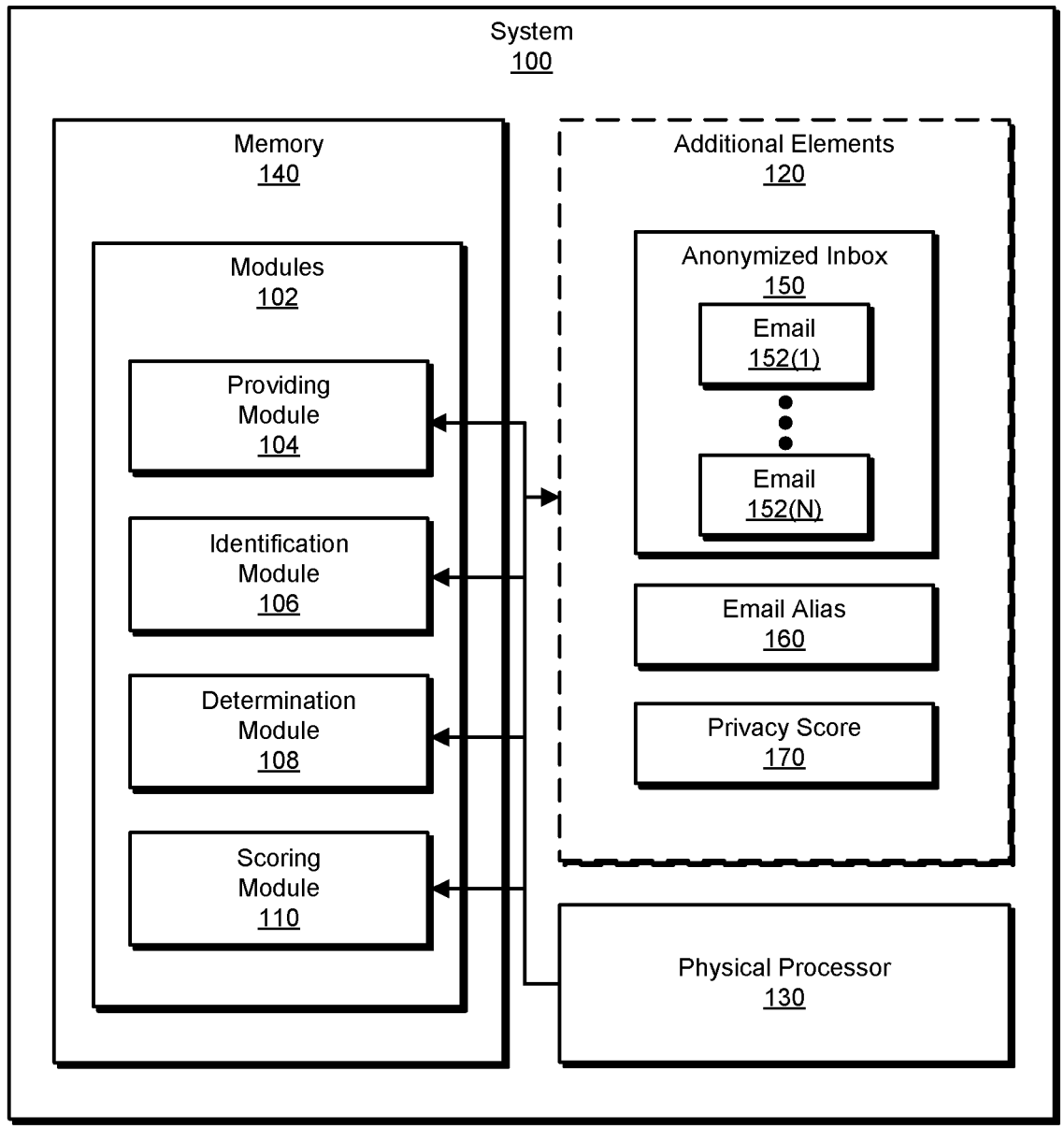
FIG. 1 is a block diagram of an example system for detecting unauthorized data shares.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting unauthorized data shares. As will be described in greater detail below, the disclosed systems and methods may collect data electronically generated by a variety of sources (e.g., data generated by online security products) to use as input for calculating a privacy score for online entities. For example, data may be collected from an anonymized inbox that indicates that a particular entity shared the user's account information with other entities. This information may then be used to form a privacy score for the particular entity. By leveraging such electronically generated data (e.g., data electronically generated by security products), the disclosed systems and methods may detect unauthorized data shares that would otherwise be undetectable and use this information to establish a privacy reputation that would otherwise be difficult to determine. In addition, the systems and methods described herein may improve the functioning of a computing device by improving the security of such devices. The systems and methods described herein may also improve the field of data security by identifying the extent to which an online entity shares a user's personal data (information that may otherwise be undetectable).

The following will provide, with reference to FIGS. 1-2 and 4-5, detailed descriptions of example systems for detecting unauthorized data shares. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 6 and 7, respectively.

FIG. 1 is a block diagram of exemplary system 100 for detecting unauthorized data shares. As illustrated in this figure, exemplary system 100 may include one or more modules 102 for performing one or more tasks. For example, and as will be explained in greater detail below, exemplary system 100 may include a providing module 104 that provides a user of an anonymized inbox with an email alias to use for a particular online entity. Exemplary system 100 may additionally include an identification module 106 that identifies one or more emails sent to the email alias from one or more different entities that are different from the particular online entity. Exemplary system 100 may also include a determination module 108 that determines, based on the one or more emails having been sent by the different entities, that the particular online entity has shared the user's email alias with other entities. Exemplary system 100 may additionally include a scoring module 110 that creates a privacy score for the particular online entity based at least in part on the determination that the particular online entity has shared the user's email alias with other entities. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting unauthorized data shares. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120 such as anonymized inbox 150. Anonymized inbox 150 generally represents any type or form of digital inbox, configured to receive emails such as emails 152(1)-(N), that is provided by an email-security service that creates and/or tracks email aliases (such as email alias 160) for a user. Email alias 160 generally represents any type or form of forwarding email address (e.g., used in order to disguise a primary email address to which the email alias forwards).

In one example, anonymized inbox 150 may create a new/unique email alias for a user when the user registers account information with an online entity (e.g., each time the user registers account information with an online entity). In some examples, emails sent to the email aliases created by the email-security service may appear in the same inbox (e.g., in anonymized inbox 150). Thus, emails sent to multiple email aliases may be configured to be sent to the same primary inbox. In some examples, anonymized inbox 150 may randomly generate the user's email aliases. In other examples, anonymized inbox 150 may generate some or all of the user's email aliases based on user input (e.g., in response to prompting the user to create the aliases).

Additional elements 120 may also include a privacy score 170. As used herein, the term "privacy score" refers to any type or form of metric indicative of the extent to which an entity maintains the privacy of its users' data. In some examples, privacy score 170 may further reflect a trustworthiness, prevalence, prominence, community opinion, and/or reputation of an entity. In some examples, privacy score may represent a numerical value (e.g., a privacy scale of 1-10 with a score of 10 signifying a best possible privacy score and a score of 1 indicating a worst possible privacy score). In some such examples, two or more factors of a privacy score may be weighted and combined to yield a single numerical value. In additional or alternative examples, privacy score 170 may represent and/or be associated with a privacy categorization. For example, an entity may receive one of three categorizations: High Privacy Entity, Moderate Privacy Entity, or Low Privacy Entity.

Figure 2:
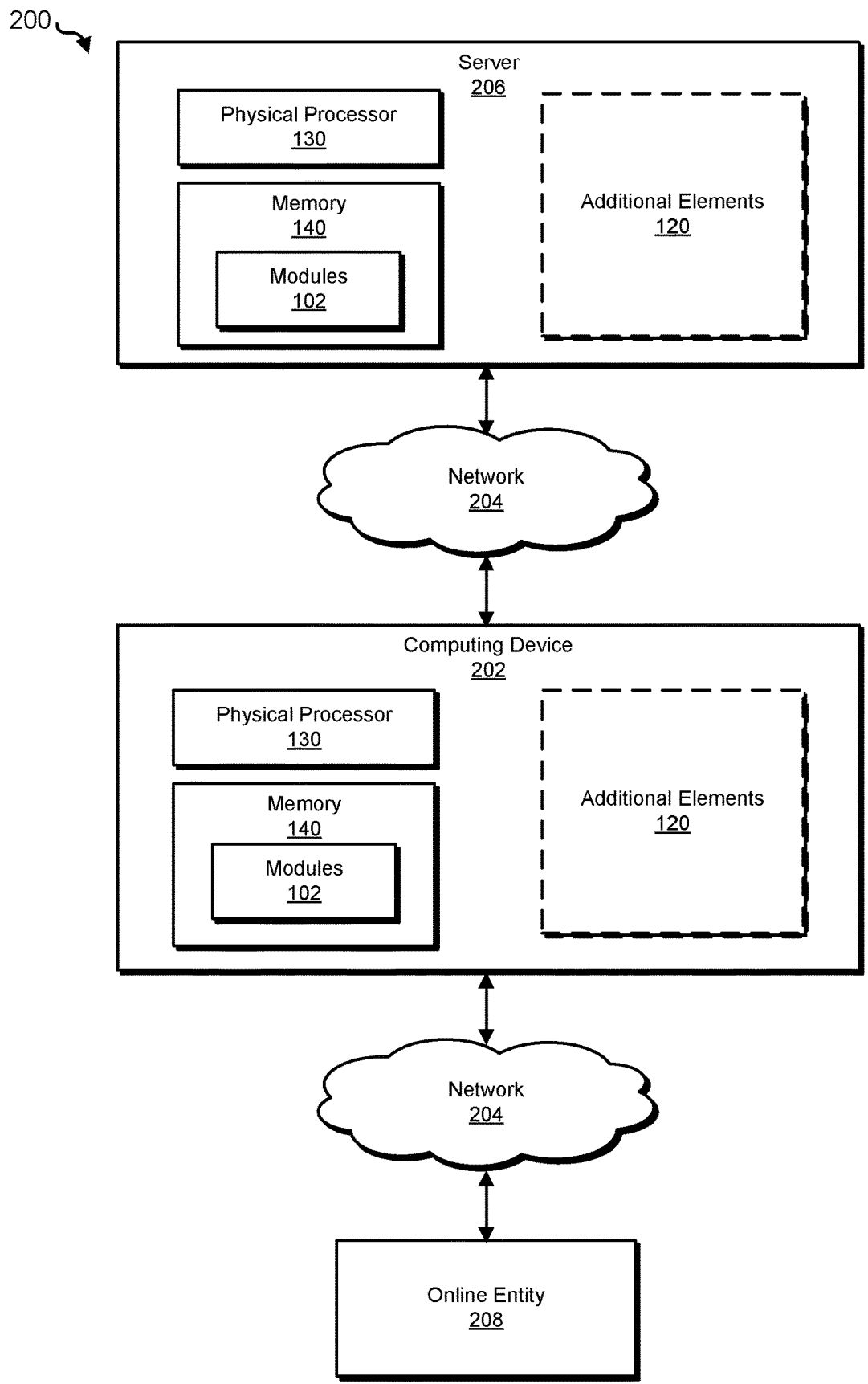
FIG. 2 is a block diagram of an additional example system for detecting unauthorized data shares.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to detect unauthorized data shares.

For example, and as will be described in greater detail below, providing module 104 may provide a user of anonymized inbox 150 with email alias 160 to use for online entity 208. Identification module 106 may identify emails 152(1)-(N) sent to email alias 160 from one or more different entities that are different from online entity 208. Determination module 108 may determine, based on emails 152(1)-(N) having been sent by the different entities, that online entity 208 has shared the user's email alias 160 with other entities. Then, scoring module 110 may create privacy score 170 for online entity 208 based at least in part on the determination that the online entity 208 has shared email alias 160 with other entities.

Computing device 202 generally represents any type or form of computing device capable of reading computer-executable instructions. In one example, computing device 202 may represent an endpoint device running client-side security software. For example, computing device 202 may represent an endpoint device of a user of a security service (e.g., that provides the user with an anonymized inbox such as anonymized inbox 150). Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Server 206 generally represents any type or form of computing device capable of performing data-security operations (e.g., using modules 102). In some examples, server 206 may be managed by a data-security provider of a security service and may represent a security server. In these examples, server 206 may create and/or manage anonymized email aliases (e.g., via an anonymized inbox), masked telephone numbers, and/or masked credit card information. In one embodiment, server 206 may analyze web content. For example, server 206 may identify (1) trackers and/or advertisements on web pages, and/or (2) content within trackers, advertisements, new articles, and/or social media on webpages. In one embodiment, server 206 may utilize tracker-crawlers to identify fingerprinting scripts served from various domains.

Additional examples of server 206 include, without limitation, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206 and/or between computing device 202 and online entity 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Online entity 208 generally represents any type or form of entity whose services, products, and/or content may be digitally accessed via the Internet. In some examples, online entity 208 may represent an online vendor, such as an online retailer and/or an e-commerce marketplace provider. Additionally or alternatively, online entity 208 may represent an online service, such as a digital streaming service and/or an online banking service. In some examples, online entity 208 may represent a website that receives login credentials from users.

Figure 3:
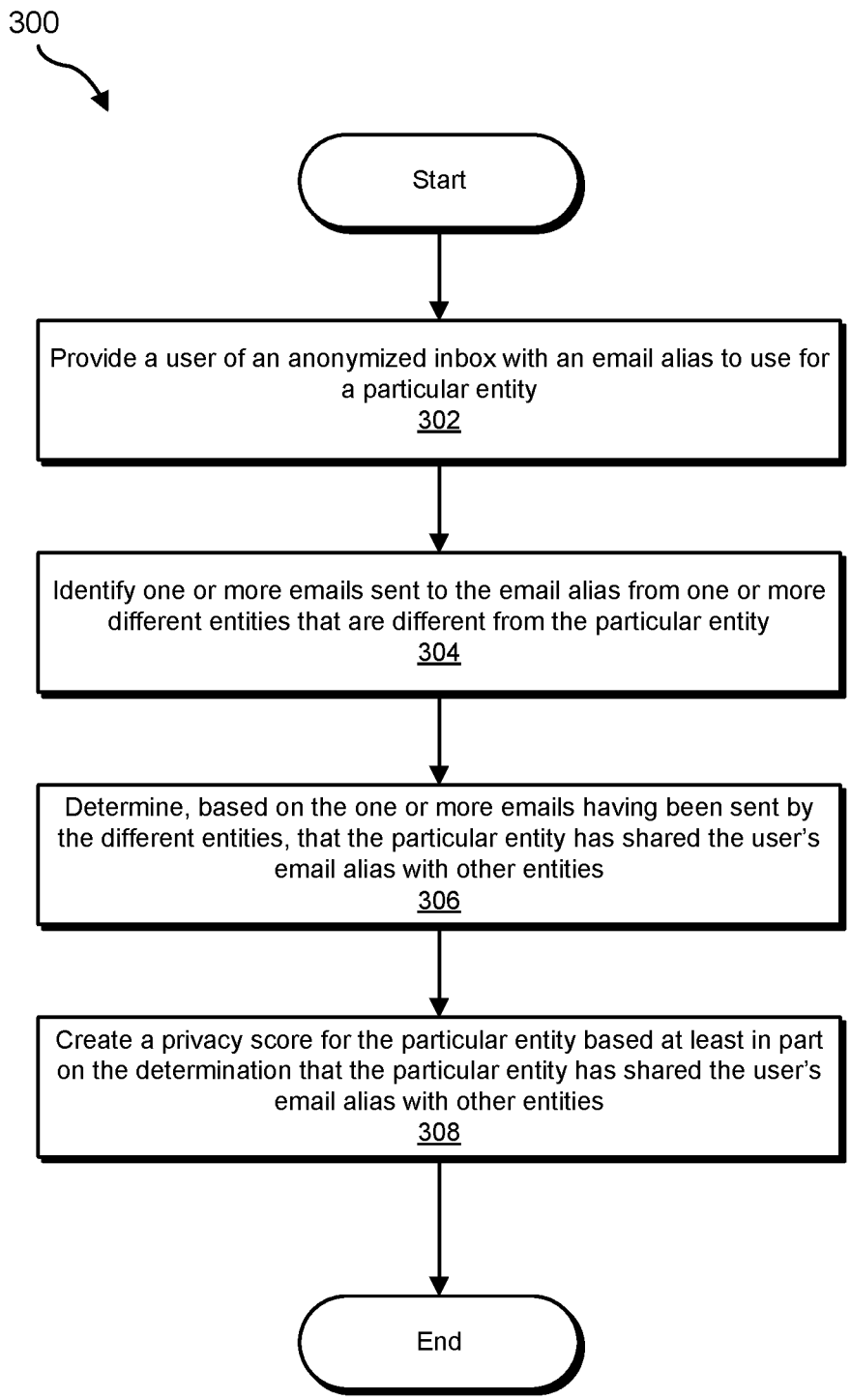
FIG. 3 is a flow diagram of an example method for detecting unauthorized data shares.

FIG. 3 is a flow diagram of an example computer-implemented method 300 for detecting unauthorized data shares. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may provide a user of an anonymized inbox with an email alias to use for a particular online entity. For example, providing module 104 may, as part of computing device 202 and/or server 206 in FIG. 2, provide a user of anonymized inbox 150 with email alias 160 to use for online entity 208.

Providing module 104 may provide the user with email alias 160 in a variety of contexts. In one example, the user may subscribe to a privacy product (e.g., offered by a security service that manages sever 206) that includes an anonymized inbox service. In this example, providing module 104 may operate as part of the security service and may provide the user with email alias 160 as part of the anonymized inbox service.

Providing module 104 may provide the user with email alias 160 in response to a variety of events. In one embodiment, providing module 104 may determine that a user is registering with (and/or subscribing to) online entity 208 and may automatically create email alias 160 in response to making that determination. In this embodiment, providing module 104 may provide the user with email alias 160 as part of a policy to create a new/unique email alias each time the user registers and/or subscribes with an online entity. In another embodiment, providing module 104 may create email alias 160 in response to receiving user input requesting the same.

Figure 4:
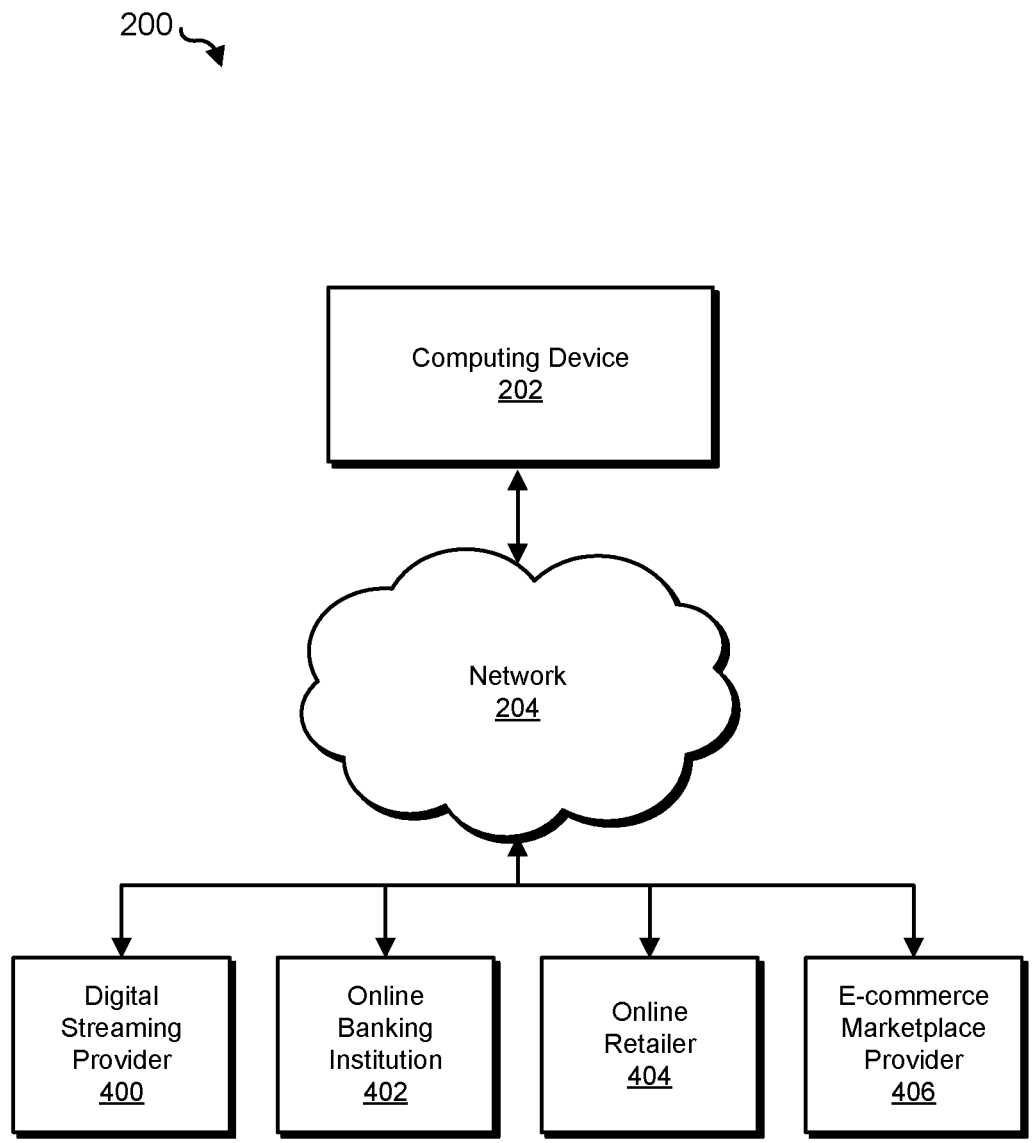
FIG. 4 is a block diagram of an additional computing system for detecting unauthorized data shares with a variety of online entities.

In some examples, the user may subscribe and/or register with a variety of online entities. In these examples, providing module 104 may provide the user with a different email alias for each of the online entities. For example, as shown in FIG. 4, the user may have an account with (1) a digital streaming provider 400, (2) an online banking institution 402, (3) an online retailer 404, and (4) an e-commerce marketplace provider 406. In this example, as illustrated in FIG. 5, providing module 104 may create email aliases 500 for the user's accounts: the email alias "makdi342@anoninbox.com" for the user to use with digital streaming provider 400, the email alias "geteid03@anoninbox.com" for the user to use with online banking institution 402, the email alias "kk045dg@anoninbox.com" for the user to use with online retailer 404, and the email alias "xiokwo245@anoninbox.com" for the user to use with e-commerce marketplace provider 406.

In some embodiments in which providing module 104 operates as part of a security service that manages anonymized inbox 150 for the user, the security service may also provide the user with one or more additional security-related services. For example, the security service may also provide the user with masked credit card information and/or masked telephone numbers to use for online entities (e.g., to use for online entity 208).

Returning to FIG. 3, at step 304, one or more of the systems described herein may identify one or more emails sent to the email alias from one or more different entities that are different from the particular online entity. For example, identification module 106 may, as part of computing device 202 and/or server 206 in FIG. 2, identify emails 152(1)-(N) sent to email alias 160 from one or more different entities that are different from online entity 208. In some embodiments, identification module 106 may (1) determine that email alias 160 corresponds to online entity 208 (e.g., has been designated for use by online entity 208), (2) identify any emails received in anonymized inbox by an entity other than online entity 208 (i.e., emails 152(1)-(N)), and (3) flag the identified emails (i.e., emails 152(1)-(N)) as coming from unauthorized sources.

Identification module 106 may identify emails 152(1)-(N) in a variety of ways. In one example, identification module 106 may monitor anonymized inbox 150, either continuously or periodically (e.g., via an add-in). In this example, identification module 106 may identify emails 152(1)-(N) as part of monitoring anonymized inbox 150. In an additional or alternative example, the user may submit emails 152(1)-(N) to identification module 106. For example, the user may submit emails 152(1)-(N) as part of a client-reporting protocol for reporting data-sharing violations. In this example, identification module 106 may identify emails 152(1)-(N) in response to receiving the data-sharing violation report from the user.

In some examples, identification module 106 may, in addition to identifying emails sent to email alias 160 from entities other than online entity 208 (i.e., from unauthorized entities), identify a number of emails that have been sent to email alias 160 from entities other than online entity 208. Additionally or alternatively, identification module 106 may identify a number of different entities (i.e., besides online entity 208) that have sent emails to email alias 160.

In examples in which modules 102 operate as part of a security service that provides additional security-related services (beyond email anonymizing services), identification module 106 may identify additional information (beyond the information relating to emails received by anonymized inbox 150). For example, in examples in which providing module 104 also provided the user with masked credit card information and/or a masked telephone number to use for online entity 208, identification module 106 may also determine that one or more different entities, that are different from online entity 208, have used the masked credit card information and/or the masked telephone number.

Identification module 106 may determine that other entities have used the masked credit card information and/or the masked telephone number in a variety of ways. For example, identification module 106 may identify a transaction on the masked credit card that was charged by an entity other than the online vendor. Additionally or alternatively, the security service may build a list of possible phone numbers associated with the vendor and may determine that a telephone number from which a call was placed does not originate from the online vendor if the telephone number does not appear on the list of possible phone numbers. In another example, identification module 106 may receive a user report declaring the breach (i.e., the unauthorized data share).

In some embodiments (i.e., in examples in which the security service analyzes web content), identification module 106 may additionally be configured to identify, on a website of online entity 208, a number of trackers and/or a number of advertisements. In one example, identification module 106 may identify the number of trackers and/or the number of advertisements directly by analyzing the website. In an additional or alternative example, identification module 106 may identify the number of trackers and/or the number of advertisements by receiving this data from a third-party service.

In one embodiment, identification module 106 may additionally be configured to (1) identify content that was present when the user visited the website of online entity 208 and (2) identify the content (at a later time) on one or more additional websites visited by the user. Additionally or alternatively, identification module 106 may use a tracker crawler to identify a fingerprinting script being served from one or more domains owned by online entity 208. In some examples, identification module 106 may additionally be configured to identify news content describing data breaches and/or unauthorized data shares by online entities, such as online entity 208.

Next, at step 306, one or more of the systems described herein may determine, based on the one or more emails having been sent by the different entities, that the particular online entity has shared the user's email alias with other entities. For example, determination module 108 may, as part of computing device 202 and/or server 206 in FIG. 2, determine, based on emails 152(1)-(N) having been sent by entities other than online entity 208, that online entity 208 has shared email alias 160 with other entities (e.g., by selling email alias 160 to the other entities).

In some examples, determination module 108 may determine that online entity 208 has performed one or more additional unauthorized data shares (besides the unauthorized sharing of the user's email alias). For example, in examples in which providing module 104 also provided the user with masked credit card and/or telephone number information to use for online entity 208 and identification module 106 determined that one or more different entities, which are different from online entity 208, used the masked credit card and/or telephone number information, determination module 108 may determine that online entity 208 shared the masked credit card and/or telephone number information with other entities based on the other entities having used the masked credit card and/or telephone information. Additionally or alternatively, in embodiments in which identification module 106 identifies content, which was present when the user visited a website of online entity 208, on one or more additional websites visited by the user at a later time, determination module 108 may determine that online entity 208 shared the content with one or more different entities (e.g., the entities associated with the one or more additional websites) based on the content having been identified on the one or more additional websites.

In some examples, determination module 108 may determine that online entity 208 has performed one or more additional unauthorized data-shares based on information collected from a data-security monitoring service. For example, determination module 108 may determine, based on information collected from a data-security monitoring service, that online entity 208 has leaked users' personal data.

Finally, at step 308, one or more of the systems described herein may create a privacy score for the particular online entity based at least in part on the determination that the particular online entity has shared the user's email alias with other entities. For example, scoring module 110 may, as part of computing device 202 and/or server 206 in FIG. 2, create privacy score 170 for online entity 208 based at least in part on the determination that online entity 208 has shared email alias 160 with other entities.

In addition to basing privacy score 170 on the determination that online entity 208 has shared email alias 160 with other entities, scoring module 110 may create privacy score 170 based on a variety of additional factors. For example, in examples in which identification module 106 identifies (1) a number of emails that have been sent to email alias 160 from an entity other than online entity 208 and/or (2) a number of different entities (i.e., besides online entity 208) that have sent emails to email alias 160, scoring module 110 may create privacy score 170 based additionally on (1) the number of emails that have been sent to email alias 160 from an entity other than online entity 208 and/or (2) the number of different entities (i.e., besides online entity 208) that have sent emails to email alias 160.

In embodiments in which modules 102 (including scoring module 110) operate as part of a security service that manages anonymized inbox 150, scoring module 110 may create privacy score 170 based additionally on data collected by server 206 from additional security-related services provided by the security service. For example, as described above in connection with steps 302-306, in some embodiments, the security service may have provided the user with masked credit card and/or telephone number information to be used with online entity 208, which online entity 208 may have shared with other entities. In this example, scoring module 110 may create privacy score 170 based additionally on the determination that online entity 208 shared the masked credit card and/or telephone number information with other entities.

As another example, in embodiments in which identification module 106 (operating as part of the security service) identifies trackers and/or advertisements on websites, as described above in connection with step 304, scoring module 110 may create privacy score 170 based additionally on the number of trackers and/or the number of advertisements identified on a website of online entity 208. Additionally or alternatively, in embodiments in which identification module 106 identifies content, which was present when the user visited a webpage of online entity 208, on one or more additional websites visited by the user at a later time, scoring module 110 may create privacy score 170 based additionally on a determination (e.g., by determination module 108) that online entity 208 shared the content with entities associated with the one or more additional websites.

As another example, in examples in which identification module 106 identifies news content describing a data breach by online entity 208, as described above in connection with step 304, scoring module 110 may create privacy score 170 based additionally on the identified news content. Additionally or alternatively, in examples in determination module 108 determines, based on information collected from a data-security monitoring service, that email aliases (such as email alias 160) have been leaked by online entity 208, scoring module 110 may create privacy score 170 based additionally on the determination that online entity 208 has leaked the email aliases (e.g., including email alias 160).

In some embodiments, modules 102 may be configured to identify email-data-sharing for multiple users (e.g., users who subscribe to the security service associated with modules 102). In these examples, determination module 108 may have determined that online entity 208 has shared email aliases of multiple users with other entities and scoring module 110 may create privacy score 170 based additionally on the aggregated unauthorized data-sharing information collected from the multiple users.

In some examples, scoring module 110 may be configured to perform a security action if privacy score 170 falls below a privacy score threshold (e.g., in response to determining that privacy score 170 falls below the privacy score threshold). The security action may be designed to protect the user against unauthorized data-sharing by online entity 208. Additionally or alternatively, the security action may be designed to protect additional users (e.g., future users who attempt to register and/or subscribe to an online service by online entity 208) against unauthorized data-sharing by online entity 208. Scoring module 110 may perform a variety of security actions. For example, scoring module 110 may alert a user of the unauthorized data sharing by transmitting a warning prompt to the user and/or to the additional users. Additionally or alternatively, scoring module 110 may block the user and/or the additional users from electronically sharing personal data with online entity 208.

In one example, scoring module 110 may create privacy scores (e.g., using the systems and methods described above) for a variety of online entities. In this example, the various privacy scores may be available in a publicly available database (e.g., as part of an online service that provides users with vendor reputation scores). In one embodiment, users could both query the database for privacy information about an online entity and contribute user-input that may be used by scoring module 110 to create the privacy scores. For example, the user could submit information indicating that his or her email alias has been shared by an online entity.

As explained above in connection with example method 300 in FIG. 3, the disclosed systems and methods may provide a system for calculating privacy scores of online sites, services, and/or vendors based on information collected by privacy products, security groups (e.g., the Institute for Defense Analyses), tracker blockers etc. For example, the disclosed systems and methods may calculate privacy scores based on information obtained by the following privacy products: (1) a privacy vault that allows users to securely store data (e.g., passwords, credit card information, email data, messages, etc.) in encrypted blobs so that only the user is able to see the data, (2) a password manager that stores login data, credit card data, contacts, etc., (3) an anonymized email inbox that creates email aliases for a user in real time whenever the user needs an email alias to register for an online service, (4) a masked credit card service (e.g., with refillable or preloaded credit cards that are tied to a persona and not a real user), (5) a masked phone number service that ties phone numbers to a persona instead of the real user, (6) an IDAnalytics service that monitors for data breaches and/or unauthorized data shares and notifies users of the origin of such breaches when they occur, and/or (7) an Ad/Tracker Blocker used to block Ads/Trackers.

To give a specific example of leveraging data collected by a privacy product to create a data privacy score for an online entity, a user of an anonymized inbox may sign up for a service with an online vendor, and the user may receive an email alias to be used with the online vendor, which will serve as the user's username for the online vendor. Because the email alias is specific to the online vendor (i.e., the online vendor is the only entity to which the user has shared the email alias), any emails coming to the email alias should be from the online vendor, not from any other vendor. In some examples, the privacy product may also randomly generate a password to be used by the user for the online vendor, and these login credentials may be stored in a password manager maintained by the privacy product. Additionally, the privacy product may create masked credit card information that the user may share with the online vendor.

The data collected from these privacy product activities may then be used as inputs into a vendor reputation score (e.g., a vendor privacy score). For example, a number of ads and/or trackers identified by the privacy product on a website of the online vendor may be used to create an initial privacy score. Then, the user's anonymized inbox may be monitored to identify if emails are being received at the email alias from an entity other than the online vendor. If emails from another entity are identified, the vendor's reputation score may be dropped because the vendor has shared (e.g., sold) the user's login information with others. Additionally, the vendor's reputation score may be dropped if ads/trackers on other websites (that do not belong to the online entity) include product information of products that were displayed on a webpage belonging to the online vendor when the user accessed the webpage of the online vendor.

Additionally or alternatively, the online vendor's reputation score may be dropped if a transaction appears on the masked credit card being charged by an entity other than the online vendor or if the masked telephone number is called from an entity other than the online vendor because the online vendor has leaked the credit card information and/or the telephone number information. In one embodiment, a security service associated with the privacy product may build a list of possible phone numbers associated with the vendor and may determine that a telephone number from which a call is placed does not originate from the online vendor if the telephone number does not appear on the list of possible phone numbers.

In one embodiment, the reputation score may also drop if a tracker crawler identifies tracking/fingerprinting scripts being served from domains owned by the online vendor, according to the aggressiveness of techniques being employed by the tracking/fingerprinting scripts. In some examples, the online vendors reputation score may also drop based on news headlines and/or darkweb information indicating that the vendor was breached.

In some examples, all of this data (describing the extent to which the online vendor shares the user's data) may be built on a per user level and then aggregated at a higher level. This may enable a security service associated with the privacy product to block trackers/ads on the vendor and/or to nudge users to not sign up for the online vendor.

Figure 6:
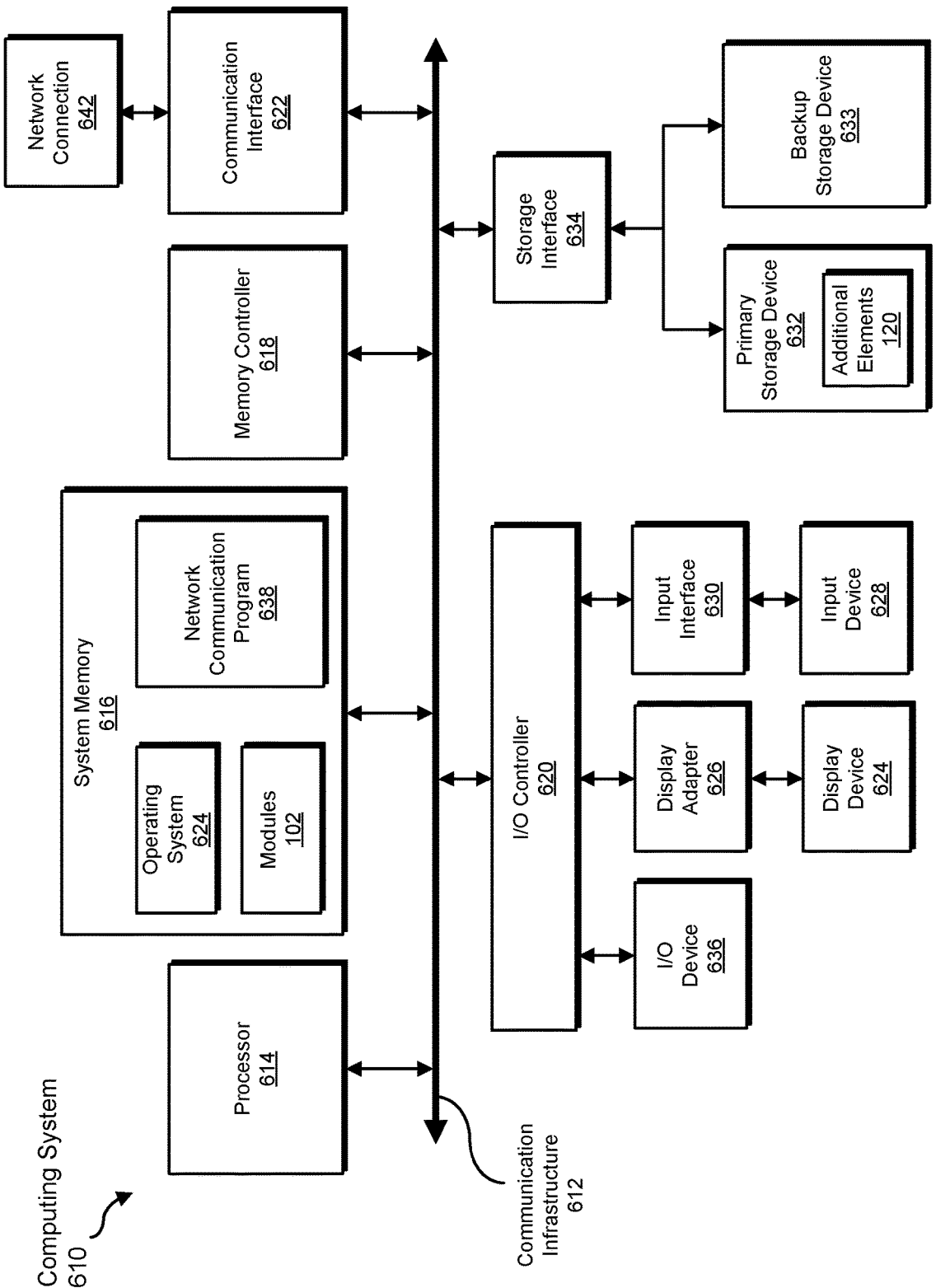
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, additional elements 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
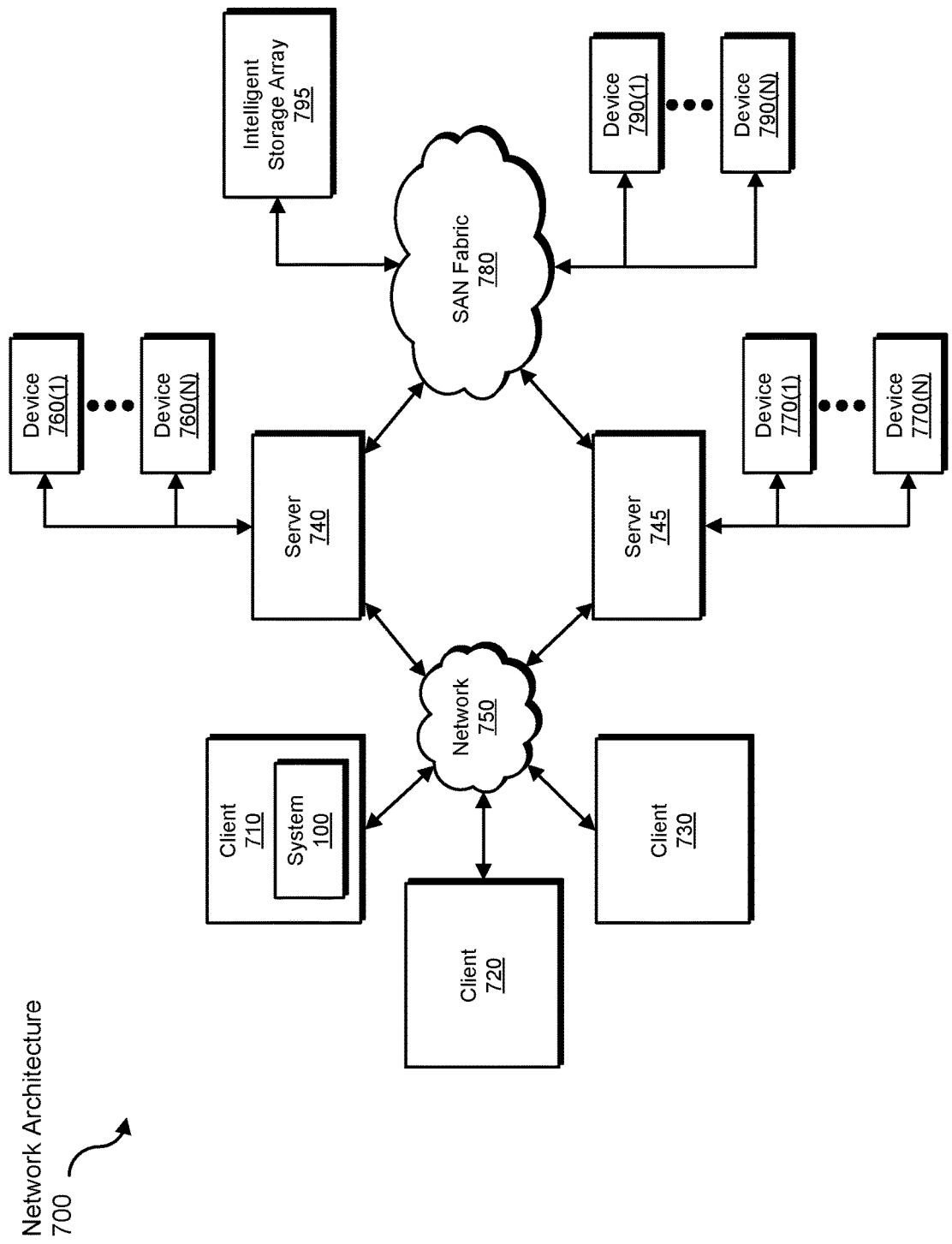
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for detecting unauthorized data shares.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive email alias and sender information and transform the email alias and sender information into data-sharing information and, eventually, a data privacy score. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting unauthorized data shares, at least a portion of the method being performed by a computing device comprising at least one processor, the method comprising:
   creating a privacy score for a particular online entity based on data generated and aggregated by a security server of a security service, wherein:
      the security service provides a plurality of digital security services to users, the digital security services comprising (1) an anonymized inbox service that manages anonymized email aliases for users and (2) a web content analysis service that analyzes web content; and
      creating the privacy score comprises creating the privacy score based on (1) a determination, collected from the anonymized inbox service, that the particular online entity has shared a user's personal data with other entities and (2) a number of fingerprinting scripts, identified by a tracker crawler of the web content analysis service, being served from one or more domains owned by the particular online entity; and
   providing the privacy score within a vendor reputation database maintained by the security service, wherein the database enables users to (1) query the database for privacy information about online entities and (2) contribute user-input that details privacy information about online entities.

2. The computer-implemented method of claim 1, wherein:
   creating the privacy score comprises creating the privacy score based additionally on a number of different entities, identified via the anonymized inbox service, with which the particular online entity has shared the user's personal data.

3. The computer-implemented method of claim 1, wherein the determination that the particular online entity has shared the user's personal data comprises a determination that the particular online entity has shared at least one of:
   an email address;
   credit card information; and
   a telephone number.

4. The computer-implemented method of claim 1, further comprising:
creating the privacy score based additionally on at least one of a number of trackers and a number of advertisements identified, via the web content analysis service, on a website of the particular online entity.

5. The computer-implemented method of claim 1, further comprising:
creating the privacy score based additionally on the web content analysis service having identified, on one or more additional websites, content in one or more advertisements and/or trackers that was present on a website of the particular online entity when the user visited the website.

6. The computer-implemented method of claim 1, wherein:
the digital security services further comprise a data security monitoring service; and
creating the privacy score comprises creating the privacy score based additionally on determining, from the data security monitoring service, that the user's personal data has been leaked.

7. The computer-implemented method of claim 1, wherein the privacy score comprises a numerical value within a numerical privacy scale.

8. The computer-implemented method of claim 1, wherein the privacy score comprises a privacy categorization.

9. The computer-implemented method of claim 1, further comprising:
creating the privacy score based additionally on identified news content describing a data breach by the particular online entity.

10. The computer-implemented method of claim 1, wherein creating the privacy score comprises:
collecting data from the digital security services on a per user level for a plurality of users and then aggregating data from the plurality of users to generate the privacy score.

11. The computer-implemented method of claim 1, further comprising:
determining that the privacy score falls below a privacy score threshold; and
protecting at least one of the user and an additional user against unauthorized data sharing by the particular online entity in response to the determination that the privacy score falls below the privacy score threshold.

12. The computer-implemented method of claim 11, wherein protecting at least one of the user and the additional user comprises at least one of:
transmitting a warning prompt to at least one of the user and the additional user; and
blocking at least one of the user and the additional user from electronically sharing personal data with the particular online entity.

13. The computer-implemented method of claim 1, wherein the particular online entity comprises at least one of:
an online vendor;
an online service; and
a website.

14. The computer-implemented method of claim 1, wherein the anonymized inbox service determines that the particular online entity has shared the user's personal data by:
providing the user with an email alias to use for the particular online entity;
identifying one or more emails sent to the email alias from one or more different entities that are different from the particular online entity; and
determining, based on the one or more emails having been sent by the different entities, that the particular online entity has shared the user's email alias with other entities.

15. A system for detecting unauthorized data shares, the system comprising:
a scoring module, stored in memory, that creates a privacy score for a particular online entity based on data generated and aggregated by a security server of a security service, wherein:
the security service provides a plurality of digital security services to users, the digital security services comprising (1) an anonymized inbox service that manages anonymized email aliases for users and (2) a web content analysis service that analyzes web content;
creating the privacy score comprises creating the privacy score based on (1) a determination, collected from the anonymized inbox service, that the particular online entity has shared a user's personal data with other entities and (2) a number of fingerprinting scripts, identified by a tracker crawler of the web content analysis service, being served from one or more domains owned by the particular online entity; and
the scoring module provides the privacy score within a vendor reputation database maintained by the security service, wherein the database enables users to (1) query the database for privacy information about online entities and (2) contribute user-input that details privacy information about online entities; and
at least one physical processor configured to execute the scoring module.

16. The system of claim 15, wherein:
the scoring module creates the privacy score based additionally on a number of different entities, identified via the anonymized inbox service, with which the particular online entity has shared the user's personal data.

17. The system of claim 15, wherein the determination that the particular online entity has shared the user's personal data comprises a determination that the particular online entity has shared at least one of:
an email address;
credit card information; and
a telephone number.

18. The system of claim 15, wherein:
the scoring module creates the privacy score based additionally on at least one of a number of trackers and a number of advertisements identified, via the web content analysis service, on a website of the particular online entity.

19. The system of claim 15, wherein the privacy score comprises a privacy categorization.

20. A non-transitory computer-readable medium comprising one or more computer-readable instructions that, when executed by at least one processor of a computing device, cause the computing device to:
create a privacy score for a particular online entity based on data generated and aggregated by a security server of a security service, wherein:
the security service provides a plurality of digital security services to users, the digital security services comprising (1) an anonymized inbox service that manages anonymized email aliases for users and (2) a web content analysis service that analyzes web content; and creating the privacy score comprises creating the privacy score based on (1) a determination, collected from the anonymized inbox service, that the particular online entity has shared a user's personal data with other entities and (2) a number of fingerprinting scripts, identified by a tracker crawler of the web content analysis service, being served from one or more domains owned by the particular online entity; and provide the privacy score within a vendor reputation database maintained by the security service, wherein the database enables users to (1) query the database for privacy information about online entities and (2) contribute user-input that details privacy information about online entities.

\* \* \* \* \*